(12) United States Patent
Okajima

(10) Patent No.: US 6,803,911 B2
(45) Date of Patent: Oct. 12, 2004

(54) IMAGE EXPRESSION METHOD AND PROGRAM USED THEREFOR

(75) Inventor: Shigeo Okajima, Shibuya-ku (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 303 days.

(21) Appl. No.: 10/079,976

(22) Filed: Feb. 20, 2002

(65) Prior Publication Data

US 2002/0122037 A1 Sep. 5, 2002

(30) Foreign Application Priority Data

Feb. 21, 2001 (JP) .................................. 2001-045242

(51) Int. Cl.⁷ .............................................. G06T 15/60
(52) U.S. Cl. ..................................................... 345/426
(58) Field of Search ................................. 345/420, 421, 345/423, 426, 419, 422, 424, 428

(56) References Cited

U.S. PATENT DOCUMENTS

| | | | | |
|---|---|---|---|---|
| 6,018,350 A | * | 1/2000 | Lee et al. .................... | 345/426 |
| 6,097,394 A | * | 8/2000 | Levoy et al. ................ | 345/419 |
| 6,163,320 A | * | 12/2000 | Barcena et al. ............. | 345/582 |
| 6,441,820 B2 | * | 8/2002 | Prater .......................... | 345/426 |
| 6,504,538 B1 | * | 1/2003 | Freund et al. .............. | 345/426 |
| 6,567,083 B1 | * | 5/2003 | Baum et al. ................. | 345/426 |
| 6,570,564 B1 | * | 5/2003 | Sowizral et al. ............ | 345/420 |
| 6,639,595 B1 | * | 10/2003 | Drebin et al. ............... | 345/426 |
| 6,664,962 B1 | * | 12/2003 | Komsthoeft et al. ........ | 345/426 |
| 6,724,383 B1 | * | 4/2004 | Herken et al. .............. | 345/420 |
| 6,756,981 B2 | * | 6/2004 | Suzuki et al. ............... | 345/426 |
| 2001/0040574 A1 | * | 11/2001 | Prater .......................... | 345/426 |

OTHER PUBLICATIONS

Kresch R et al: "Skeleton–Based Morphological Coding of Binary Images" IEEE Transactions on Image Processing, IEEE Inc. New York, US, vol. 7, No. 10, Oct. 1, 1998, pp. 1387–1399.

Przemyslaw Rokita: "A Model for Rendering High Intensity Lights" Computers and Graphics, Pergamon Pres Ltd. Oxford, GB, vol. 17, No. 4, Jul. 1, 1993, pp. 431–437.

* cited by examiner

*Primary Examiner*—Mark Zimmerman
*Assistant Examiner*—Enrique L Santiago
(74) *Attorney, Agent, or Firm*—Jordan and Hamburg LLP

(57) ABSTRACT

At respective positions spaced from each other on an optic axis of illumination light, a plurality of polygons, each of which corresponds to the shape of a transverse cross section at each position of a virtual region gradually expanded as the illumination light advances from a light source 1 in an optic axis direction are disposed so that the normal of each polygon orients toward a view point in a virtual three-dimensional space. The position of each polygon on the optic axis is set so that at least adjacent polygons are partially superimposed. A texture expressing divergence of illumination light is mapped to each polygon. The size in a direction orthogonal to the optic axis of a virtual region is changed based on a distance from the view point to the light source. The magnification of the virtual region to the distance from the light source is differentiated based on a relationship between an optic axis direction and a direction in which the light source is viewed from the view point.

22 Claims, 8 Drawing Sheets

IMAGE EXPRESSION METHOD AND PROGRAM USED THEREFOR

BACKGROUND OF THE INVENTION

The present invention relates to a method for expressing illumination light by utilizing a computer graphics technique.

In the field of three-dimensional computer graphics used for game image generation or the like, a model disposed in a virtual three-dimensional space defined in accordance with a world coordinate system is expressed by using a combination of polygons, and a variety of textures are mapped on the surface of such polygon, thereby improving a model quality. Such a method is employed in the case of expressing divergence of the illumination light from a light source such as electric bulb. For example, there is attempted an expression method for pasting a substantially cone shaped three-dimensional model that corresponds to a range in which the illumination light diverges is composed of a polygon, and a texture expressing how the illumination light diverges on the surface of that polygon.

However, in a conventional expression method, the three-dimensional model is composed of a polygon, and thus, a burden on image processing increases. Although the processing burden is reduced as long as a planar model is utilized, a change in viewing illumination light according to the position of the light source or a change in optical axis direction cannot be fully expressed, and there is apprehension that the reality of an image is degraded.

SUMMARY OF THE INVENTION

The present invention has been made in order to solve the foregoing problem. It is an object of the present invention to provide an image expression method capable of providing an image of more realistic illumination light while reducing the processing burden and a computer program used for achieving the same.

According to an aspect of the present invention, there is provided a method for expressing illumination light from a light source placed in a virtual three-dimensional space by image processing employing a computer, the method comprising the steps of: disposing a plurality of polygons, each of which corresponds to a shape of a transverse cross section at each position of a virtual region that gradually expands with advancement from the light source in an optic axis direction, at respective positions spaced from each other on an optic axis of the light source so that a normal of each polygon is oriented toward a view point set in the virtual three-dimensional space, said respective positions being set in such a manner that at least adjacent polygons are partially superimposed on each other; mapping a texture that expresses divergence of the illumination light to each polygon; changing a size of the virtual region in a direction orthogonal to the optic axis based on a distance from the view point to the light source, and differentiating a magnification of the virtual region to the distance from the light source based on a relationship between the optic axis direction and a direction in which the light source is viewed from the view point.

According to the expression method of the present invention, polygons from the vicinity of the light source are arranged in order from the smallest one along the optic axis direction, and a texture of illumination light is mapped on these polygons, whereby a virtual region in which the illumination light is visualized as if it were divergent is observed from the view point. At the center side of the virtual region, there occurs a change such that the texture mapped on such each polygon is superimposed, the illumination luminance is high, a degree of superimposition of the texture decreases at the periphery, and the luminance is lowered. In this manner, the illumination light can be naturally expressed. Moreover, the processing burden is reduced because polygons being planar graphics are arranged so as to orient the view point instead of forming a complicated three-dimensional model by combining the polygons. The size or magnification of the virtual region is controlled based on a relationship between the distance from the view point or optic axis direction and the direction in which the light source is viewed from the view point. Thus, the range of divergence of the illumination light is changed according to the position of the light source viewed from the view point or change in the optic axis direction, and the reality of an image of illumination light can be fully increased.

In the expression method of the present invention, as a distance from the view point to the light source increases, the virtual region may be expanded in a direction orthogonal to the optic axis. In this case, as the distance from the light source is longer, a phenomenon in which the range of the illumination light is seen to be broadened can be expressed, and the reality of an image is increased more significantly. In particular, as the distance from the view point to the light source increases, in the case where the virtual region is expanded in a direction orthogonal to the optic axis uniformly over the full length of the light axis direction, processing can be simplified, which is preferable.

In the expression method of the present invention, as a relationship between the optic axis direction and the direction in which the light source is viewed from the view point is closer to an orthogonal state, the magnification of the virtual region to the distance from the light source may be set to be smaller. In this case, a difference in view of the luminous flux of illumination light between a case in which the luminous flux ejected to be comparatively narrowly collimated from the light source is viewed laterally and a case when the luminous flux is viewed toward the light source can be fully expressed.

That is, in the former case, the luminous flux is laterally observed, and thus, a degree of expansion of the luminous flux is comparatively small. The collimated luminous flux can be properly expressed by reducing the magnification of the virtual region concurrently. On the other hand, in the latter case, even if the collimated luminous flux is ejected, where the light source is observed in a direction in which the luminous flux advances, the illumination light is visualized as if it were greatly divergent in the vicinity of the light source. Therefore, the magnification of the virtual region is increased, whereby how greatly the illumination light diverges can be properly expressed.

In combination with such a change in magnification, as a relationship between the optic axis direction and the direction in which the light source is viewed from the view point is closer to a parallel state, the number of the polygons may be reduced. If the magnification of the virtual region is large, more polygons gather within a narrow range relevant to the optic axis direction. Thus, even if the number of polygons is reduced, an effect on expression of illumination light is relatively reduced, the number of polygons is reduced without degrading the reality of an image, and the processing burden can be further reduced.

In the image expression method of the present invention, as the distance from the view point to the light source increases, the transparency of each texture maybe increased. In this case, it is possible to express how the luminance of illumination light changes according to the distance from the view point to the light source. In particular, in the case of combination with expansion and reduction of the virtual region according to the distance, it is possible to express how the illumination light gathers within a comparatively narrow range when the light is close to the light source. When the light is distant from the light source, it is possible to express how lightly the illumination light diverges within a comparatively wide range. Therefore, the reality of an image of the illumination light is improved more remarkably.

In such case of changing transparency, a polygon, of which the transparency of the texture to be mapped is greater than a predetermined value may be eliminated from a depicting target. In this case, such a polygon, which cannot be observed even if it is depicting, is eliminated from a depicting target, whereby the processing burden can be reduced.

In the image expression method of the present invention, the texture mapped polygon is disposed at a predetermined reference point associated with the light source as well, whereby the size of the polygon at the reference point maybe changed based on the distance from the view point to the light source. In this case, in addition to the luminous flux of illumination light ejected from the light source, the light diverging in a spherical shape at the periphery of the light source as well can be expressed, and the reality of an image is improved more remarkably.

In addition, if the polygon at the reference point is expanded as the distance from the view point to the light source increases, the divergence of the light at the periphery of the light source is observed to be relatively greater than the luminous flux of ejection light from the light source expressed by a polygon disposed in the virtual region, which is preferable. Further, as the distance from the viewpoint to the light source increases, in the case where the transparency of the polygon at the reference point has been decreased, the divergence of the light in the vicinity of the light source is clearly observed as the distance from the view point to the light source increases. As a result, the reality of an image is improved more remarkably. In particular, in the case of combining a configuration in which the transparency of the texture of the polygon disposed in the virtual region is decreased as the distance increases, when the light source is observed closely, the luminous flux of the illumination light is expressed to be enhanced more. In the case where the light source is observed distantly, the light in the vicinity of the light source can be expressed to be enhanced more. Thus, the visibility of the illumination light according to the distance can be realistically expressed.

A program for expressing illumination light from a light source placed in a virtual three-dimensional space by image processing employing a computer, said program causing a computer to execute: a process for disposing a plurality of polygons, each of which corresponds to a shape of a transverse cross section at each position of a virtual region that gradually expands with advancement from the light source in an optic axis direction, at respective positions spaced from each other on an optic axis of the light source so that a normal of each polygon is oriented toward a view point set in the virtual three-dimensional space; and a process for mapping a texture that expresses divergence of the illumination light to each polygon, wherein, in the disposing process, said respective positions are set in such a manner that at least adjacent polygons are partially superimposed on each other, a size of the virtual region is changed in a direction orthogonal to the optic axis based on a distance from the view point to the light source, and a magnification of the virtual region to the distance from the light source is differentiated based on a relationship between the optic axis and a direction in which the light source is viewed from the view point.

This program is read and executed by a computer, whereby the image expression method of the present invention can be carried out.

The program of the present invention, as described below, can comprise the preferred mode of the above described expression method. That is, the program of the present invention may be configured so as to expand the virtual region in the direction orthogonal to the optic axis as the distance from the view point to the light source increases. The program may be configured so as to expand the virtual region in a direction orthogonal to the optic axis uniformly over the full length of the optic axis direction as the distance from the view point to the light source increases. The program may be configured so as to set the magnification of the virtual region to be smaller relevant to the distance from the light source as a relationship between the optic axis direction and the direction in which the light source is viewed from the view point is closer to an orthogonal state. The program may be configured so as to reduce the number of the polygons as a relationship between the optic axis direction and the direction in which the light source is viewed from the view point is closer to a parallel state. The program may be configured so as to increase the transparency of each texture as the distance from the view point to the light source increases. The program may be configured so as to eliminate from a depicting target a polygon of which the transparency of the texture to be mapped is greater than a predetermined value. The program may be configured so as to dispose the texture mapped polygon at a predetermined reference point associated with the light source as well, and change the size of the polygon at the reference point based on the distance from the view point to the light source. The program may be configured so as to expand the polygon at the reference point as the distance from the view point to the light source increases. The program may be configured so as to decrease the transparency of the polygon at the reference point as the distance from the view point to the light source increases.

Further, the program of the present invention may be provided to a user after recorded in a storage medium or may be provided to a user after loaded on a wired or wireless transmission medium.

The term "polygon" generally denotes a planar graphics or a plane figure having a finite number of vertexes. In the present invention, this term denotes a planar graphics as a minimal unit for configuring an object in computer graphics, and may contain a circle that does not have a vertex. The virtual region may be a cone or frustum shape having a predetermined magnification over its full length or may be variously formed in water drop shape or trumpet shape whose taper rate is not constant. The vertexes of the virtual region may not always be coincident with the light source.

DETAILED DESCRIPTION OF THE INVENTION

Figure 1A:
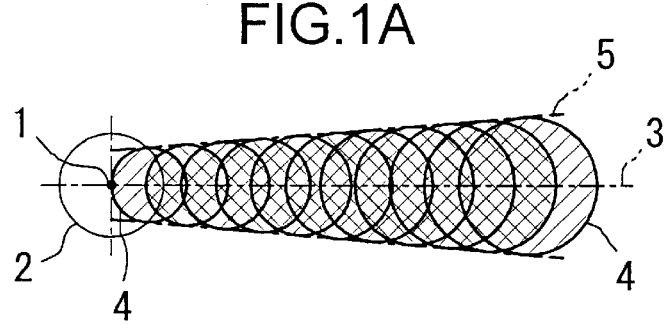
FIGS. 1A to 1D are diagrams showing an example of disposition of a polygon for expressing illumination light.
Figure 1B:
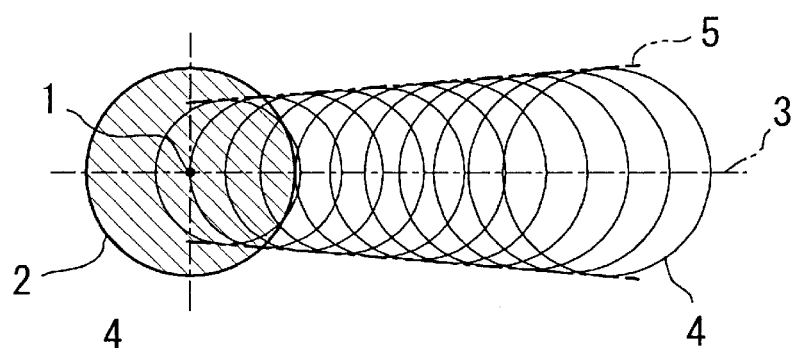
Figure 1C:
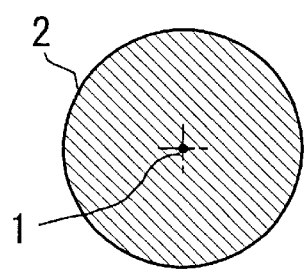
Figure 1D:
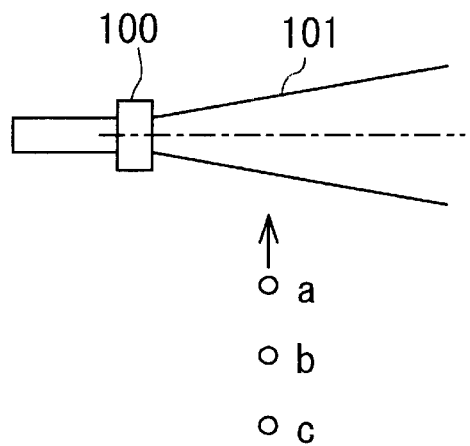
Figure 2A:
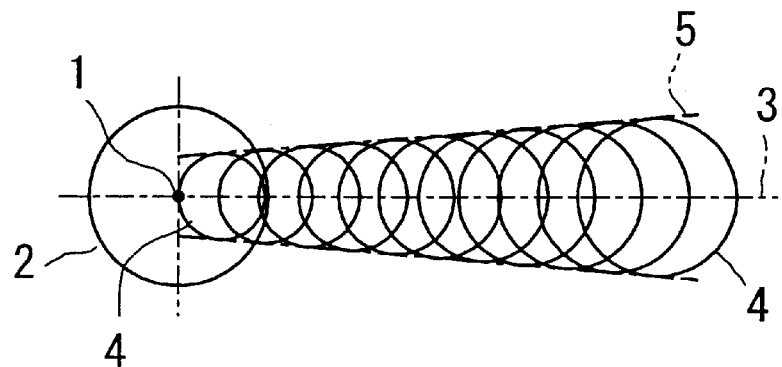
FIGS. 2A to 2C are diagrams showing another example of disposition of a polygon for expressing illumination light.
Figure 2B:
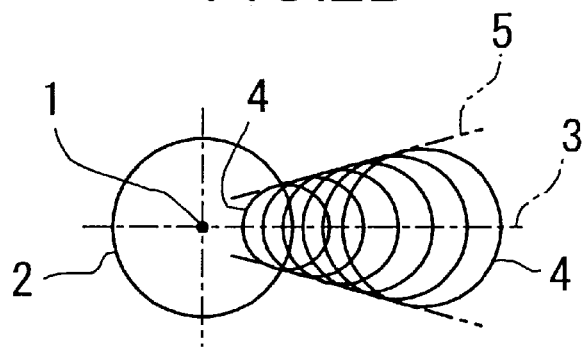
Figure 2C:
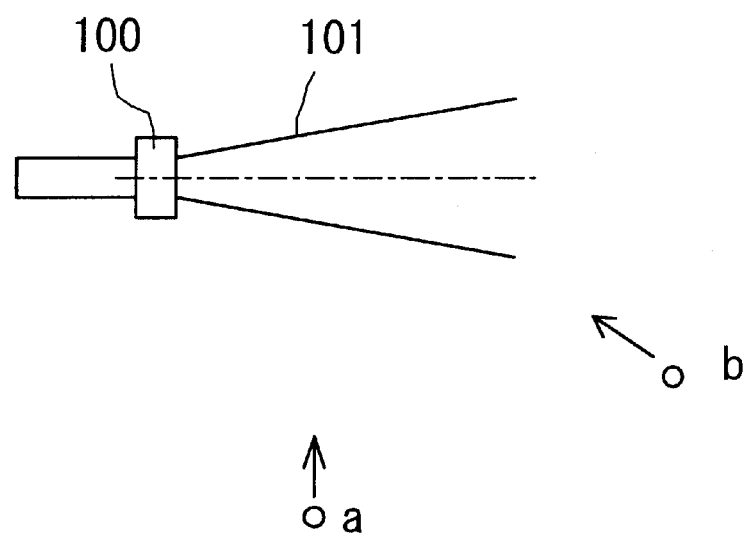

FIG. 1 and FIG. 2 each shows an example of disposition of polygons in the case of forming an image for expressing illumination light ejected from a flashlight in accordance with the present invention. That is, FIG. 1A to FIG. 1C each shows polygon disposition, in the case of expressing an image when, as shown in FIG. 1D, an illumination light 101 ejected from a flashlight 100 is viewed in a direction substantially orthogonal to an optic axis from a lateral view point "a", "b", or "c". FIGS. 2A and 2B each shows disposition of polygons for expressing an image when, as shown in FIG. 2C, an illumination light 101 ejected from the flashlight 100 is viewed from the lateral view point "a" or a diagonal front view point "b".

As shown in FIG. 1A, in the expression method of this embodiment, one circular polygon 2 is disposed while a light source 1 and a center are coincident with each other, and a plurality of polygons 4 . . . 4 are disposed so as to be superimposed on each other along an optic axis 3 of illumination light ejected from the light source 1. In the following description, conveniently, the polygon 2 is referred to as a light source polygon, and each polygon 4 is referred to as a luminous flux polygon in order to discriminate them.

The normal direction of each of the polygons 2 and 4 is oriented toward a view point set in a virtual three-dimensional space. In other words, the polygons 2 and 4 are always disposed to be viewed in their normal direction from the view point in a virtual three-dimensional space.

The light source polygon 2 is used for expressing spherical divergence of the illumination light in the vicinity of the light source 1, and the luminous flux polygon 4 is used for expressing the luminous flux of the illumination light ejected from the light source. The diameter of the light flux polygon 4 is defined as follows.

There is set a cone shaped virtual region 5 whose diameter gradually expands as the illumination light advanced from the light source 1 in the optic axis direction. The magnification (taper rate) of the diameter of the virtual region 5 may be constant at each position in the optic axis direction or may be changed according to a place. In any case, the virtual region 5 may be set in a shape suitable to express the luminous flux of the illumination light ejected from the light source 1. The vertex of the virtual region 5 may be coincident or not with the light source 1. The length of the virtual region 5 may be defined according to the illumination light coverage.

The number of luminous flux polygons 4 to be disposed in the virtual region 5 is properly selected, and the positions on the optic axis 3 on which the center points of these polygons 4 should be disposed are determined. Intervals between the center points of the polygons 4 concerning the optic axis direction may be constant or may be changed according to a place. For example, the intervals may be set to be smaller at a place close to the light source 1 or may be set to be larger at a place distant from the light source 1.

The diameter of the virtual region 5 at the position of the determined center point is set as that of the polygon 4 placed at that point. Namely, the luminous flux polygon 4 is obtained as a circular shape that corresponds to the transverse cross section of the virtual region 5 at each position on the optic axis 3. The polygon 4 may be formed in a polygonal shape that is approximated in the transverse cross section of the virtual region 5 without being limited to such circular shape. In any case, the luminous flux polygon 4 is obtained as a circular or pseudo-circular planar graphics.

The diameter of each of the polygons 2 and 4 is controlled according to a distance from a view point. FIG. 1A and FIG. 1B each shows how the diameter is changed. The polygons 2 and 4 each increases in diameter as the distance from the view point to the light source 1 increases. An increase in diameter of the polygon 4 is achieved by uniformly expanding the diameter of the virtual region 5 over its full length. However, the taper rate of the virtual region 5 is expanded due to an increase in distance, whereby the diameter of the polygon 4 at the tip end side (at a side distant from the light source 1) may be changed significantly in comparison with that of the polygon 4 at the light source 1 of the region 5.

On the other hand, a variation in diameter of the above described virtual region 5, or namely the diameter of each luminous flux polygon 4 is controlled based on a relationship between the direction of the optic axis 3 and the direction in which the light source 1 is viewed from the view point. FIG. 2A and FIG. 2B each shows an example. As shown in FIG. 2A, in the case where illumination light is laterally viewed to be substantially vertical to the optic axis, a variation in diameter of the virtual region 5 is small. Namely, a change in diameter of each polygon 4 is gentle. In contrast, as shown in FIG. 2B, the direction in which the light source 1 is viewed from the view point is close to the optic axis direction, a variation in diameter of the virtual region 5 is set greatly. Thus, a change in diameter of each polygon 4 is steep, and many polygons are disposed so as to be superimposed on each other within short intervals. In this way, a variation in diameter of the virtual region 5 is differentiated based on a relationship between the direction in which the light source 1 is viewed from the view point and the optic axis direction, thereby making it possible to properly express how the divergence of the luminous flux of illumination light changes according to a direction. As shown in FIG. 2B, in the case where a variation in diameter of the virtual region 5 is increased, a degree of superimposition of polygons 4 increases. Thus, even if the number of polygons is reduced, an effect on expression of illumination light is relatively small. Therefore, when the direction in which the light source 1 is viewed from a view point is close to a predetermined state relevant to the optic axis direction, the number of polygons 4 can be reduced, whereby a burden on image processing may be reduced.

Figure 3:
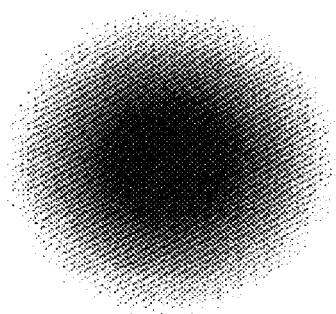
FIG. 3 is a diagram showing an example of a texture to be mapped to the polygon shown in FIG. 1 and FIG. 2.

FIG. 3 shows an actual example of a texture to be mapped to a respective one of the polygons 2 and 4. This texture expresses the divergence of illumination light, and is schematically circular. Its color is set to a milk-white color, for example, according to the color of illumination light.

However, in FIG. 3, gradation is inverted in order to easily grasp the texture. In order to show how the illumination light diffuses, gradually stronger shading is applied to the texture, as it is closer to the periphery. In this manner, illumination light is frequently expressed such that the luminance is high at the center and low at the periphery. Such texture is mapped to a respective one of the polygons 2 and 4, thereby making it possible to form a realistic image of illumination light.

Transparency is set to the texture to be mapped to each of the polygons 2 and 4. The available transparency is within the range of 0 to 100. Namely, the texture transparency is set to any one of a so called semitransparent level to complete transparent level other than an opaque state indicating transparency 0. Although the transparency of each of the polygons 2 and 4 may be always constant, the transparency is preferable changed based on a distance up to the light source 1.

That is, with respect to a light source polygon 2, its transparency is decreased, as the distance from the view point to the light source 1 increases. In contrast, with respect to a luminous flux polygon 4, its transparency is increased as the distance from the view point to the light source 1 increases. The hatched portions shown in FIG. 1A and FIG. 1B each indicates that the transparency is set to be small. As is evident from these figures, if the distance up to the light source 1 is short, the texture mapped to the luminous flux polygon 4 is relatively outstanding. If the distance up to the light source 1 is long, the texture mapped to the light source polygon 2 is relatively outstanding. Namely, the luminous flux of illumination light is enhanced when closed to the light source 1, and when distant from the light source 1, the luminous flux is faded and the vicinity of the light source 1 is relatively bright in a spherical shape. Further, the distance from the view point to the light source 1 exceeds a predetermined limit, the transparency of texture to be mapped to the luminous flux polygon 4 is set to 100. As a result, as shown in FIG. 1C, only the texture on the light source 1 is observed. In this way, the polygon of which the texture transparency is set 100 cannot be observed, and is excluded from a depicting target in computer graphics. Namely, a burden on image processing can be reduced by the polygon free of being disposed in a virtual three-dimensional space. However, even before the transparency reaches 100, a polygon of which the texture transparency rises to an extent such that the texture cannot be eventually observed may be excluded from a depicting target. The number of polygons excluded from a depicting target may be increased stepwise according to the transparency.

In the foregoing description, although the center of the light source polygon 2 is coincident with the light source 1, there is no need to always place the center of the polygon 2 on the light source 1. The center of the polygon 2 may be placed at a position distant from the light source 1 in the optic axis direction with a predetermined distance. The center of the polygon 2 may be changed according to the distance from the view point to the light source 1.

Figure 4:
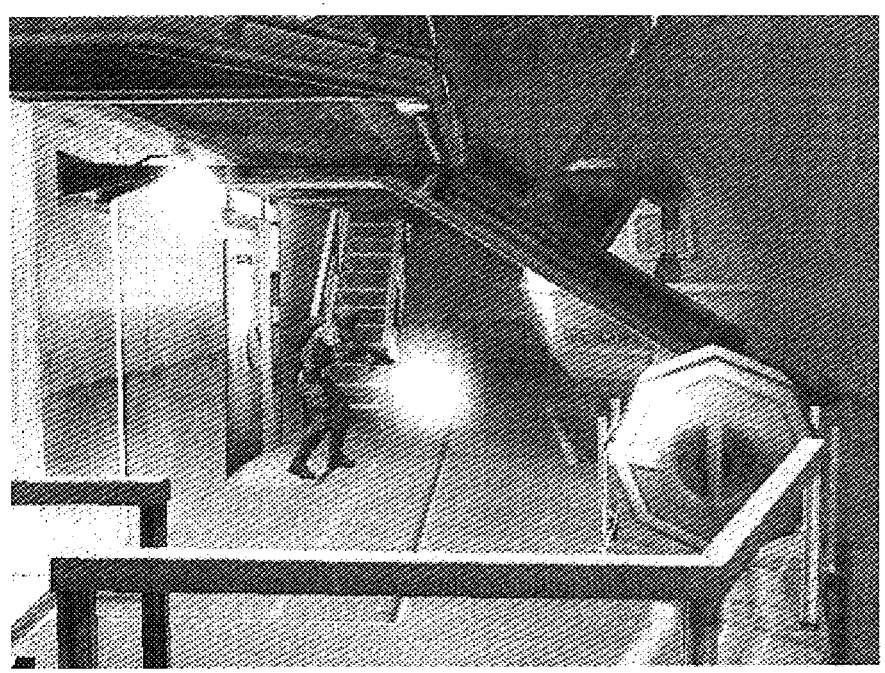
FIG. 4 is a diagram showing an example of an image of illumination light expressed in accordance with the present invention.
Figure 5:
FIG. 5 is a diagram showing another example of an image of illumination light expressed in accordance with the present invention.
Figure 6:
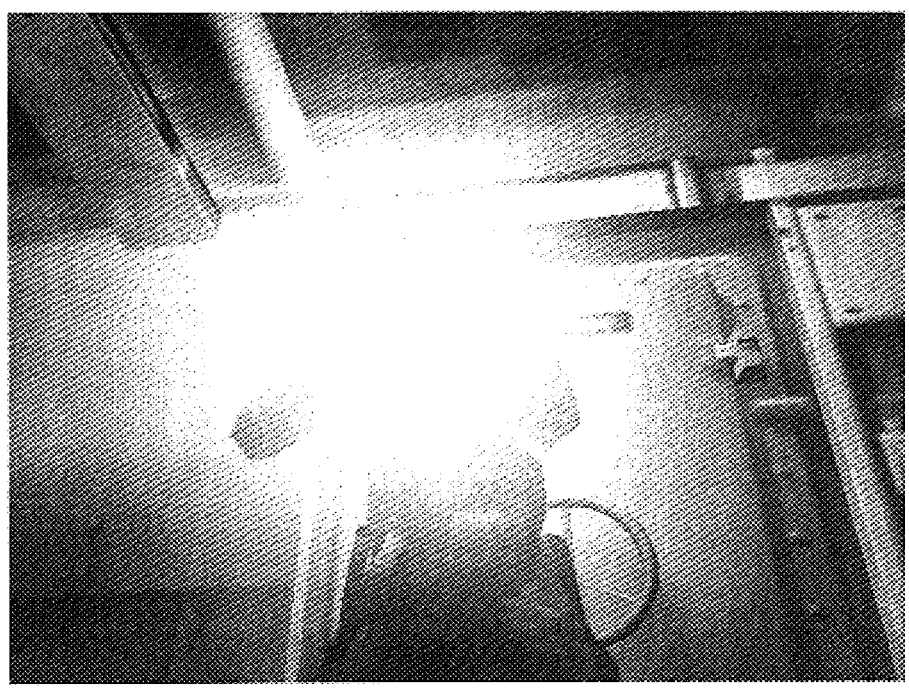
FIG. 6 is a diagram showing still another example of an image of illumination light expressed in accordance with the present invention.

FIG. 4 to FIG. 6 each shows an example of an image of illumination light actually depicted according to the above method. FIG. 4 shows a case in which the distance up to the light source is long, and FIG. 5 shows a case in which the distance up to the light source is short, respectively. In an example shown in FIG. 4, a dim circular illumination light is observed in the vicinity of the tip end of the flashlight owned by a character, and the luminous flux ejected from the flashlight is not outstanding. In contrast, in FIG. 5, a cone shaped luminous flux ejected from the flashlight is clearly observed, and the divergence of the small circular illumination light is slightly observed in the vicinity of the light source. FIG. 6 shows an image when the flashlight is viewed from its frontal side, and it is well expressed as to how circularly an illumination light with high luminance diverges.

The image expression method described above is available for use in three-dimensional image processing in a variety of fields. An example of carrying out the expression method of the present invention will be described in FIG. 7 and FIG. 8 by way of showing a game machine using a computer.

Figure 7:
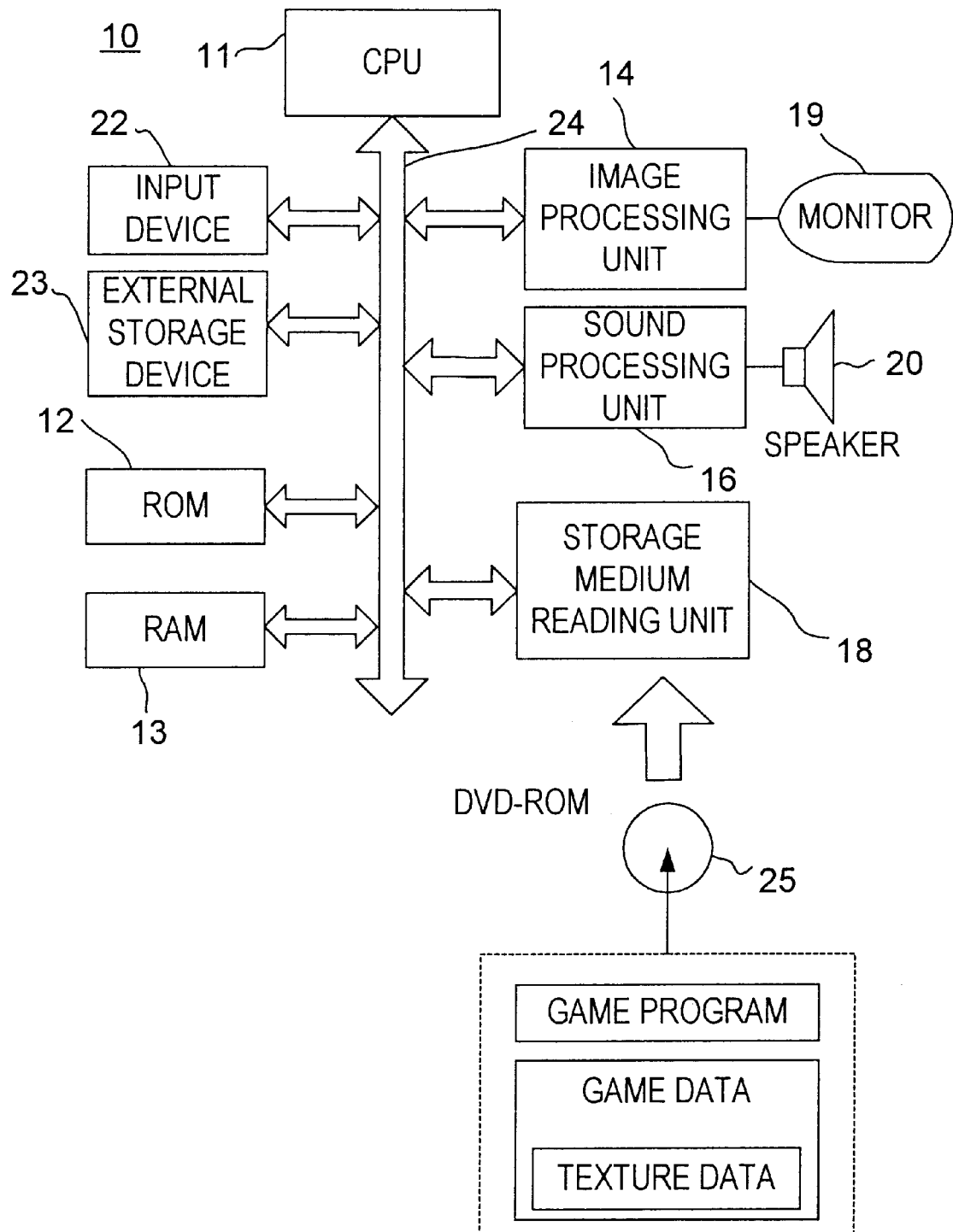
FIG. 7 is a functional block diagram of a game machine for executing the method of the present invention.

FIG. 7 is a block diagram showing a typical control system of a game machine 10 using a computer. As is well known, a game machine being a computer executes a predetermined game in accordance, with a game program recorded in a storage medium (for example, DVD-ROM) 25. This game machine comprises: a CPU 11 primarily configuring a microprocessor; a ROM 12 and a RAM 13 that are main storage devices for the CPU 11; an image processing unit 14 and a sound processing unit 16 for carrying out processing suitable image processing and voice processing based on an instruction from the CPU 11; and a storage medium reading unit 18 for reading data or the like from the storage medium. In the ROM 12, there is written an operating system being a program required for controlling an operation of the entire game machine 10. In the RAM 13, there is written a program or data for a game read from a DVD-ROM 25 being a storage medium as required. The image processing unit 14 receives image data from the CPU 11, and develops the image data that corresponds to the game screen over a built-in frame buffer (not shown). Then, this processing unit converts the depicted image data into a predetermined video reproduction signal, and output the converted signal to a monitor 19 at a predetermined timing. The sound processing unit 16 reproduces data such as voice or music read out from the DVD-ROM 25 or sound source data and the like, to be outputted from a speaker 20. The reading unit 18 reads a program or data recorded on the DVD-ROM 25 in accordance with an instruction from the CPU 11, and outputs a signal that corresponds to the read contents. In the DVD-ROM 25, there is recorded a program or data required for carrying out the image expression method according to the present invention. In general, a home-use television set is used for the monitor 19, and a build-in speaker thereof is used for the speaker 20. Further, an input device 22 and an external storage device 23 are connected to the CPU 11 via a bus 24, respectively. The external storage device 23 is provided as a storage device capable of rewriting data such as nonvolatile semiconductor memory, hard disk, or magneto-optical disk, for example. Such a configuration is merely provided as an example, and a configuration of the computer to which the expression method of the present invention is applied may be changed as required.

Figure 8:
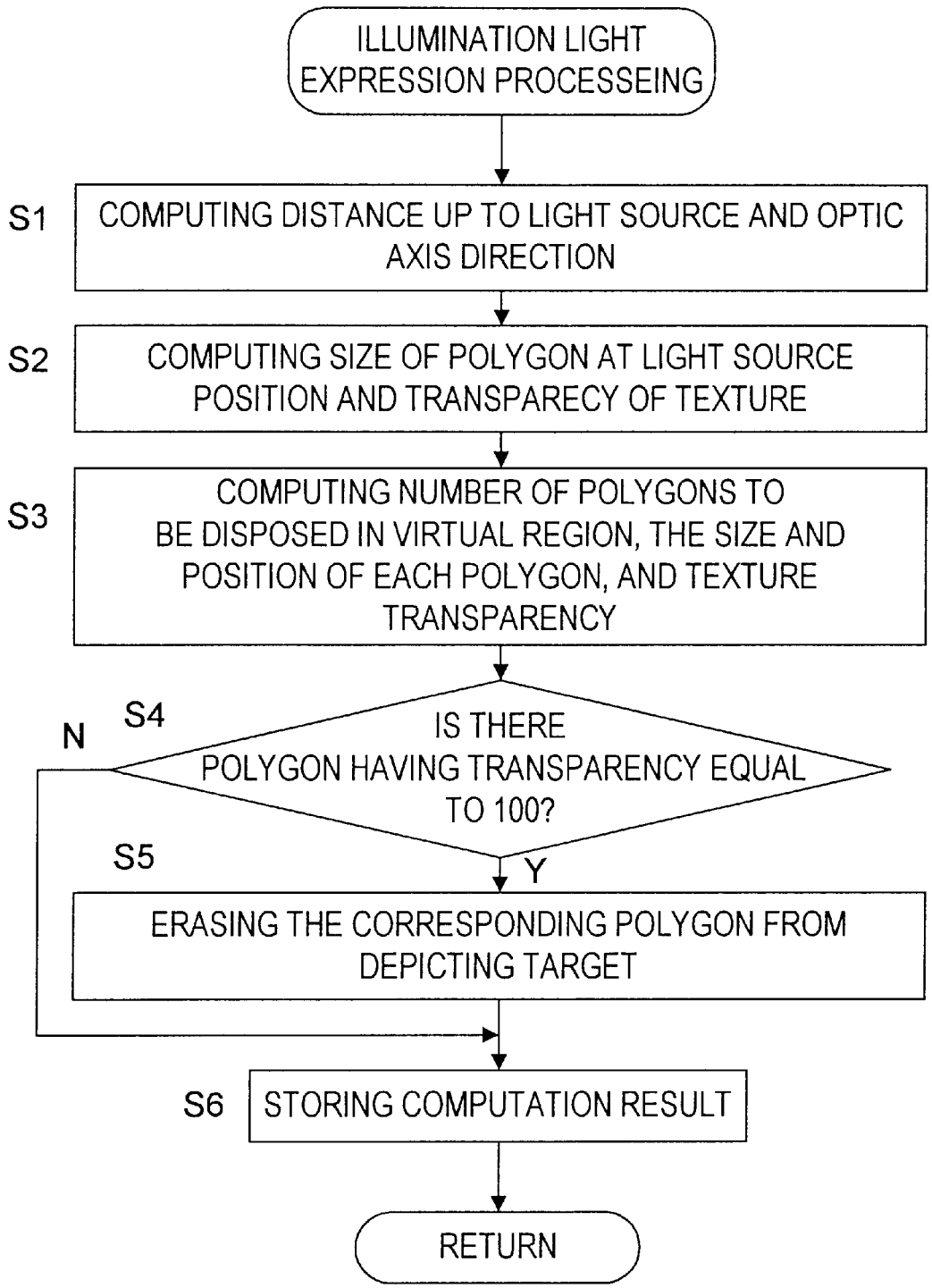
FIG. 8 is a flow chart showing procedures for executing the expression method of the present invention by means of the game machine shown in FIG. 7.

A program recorded in the DVD-ROM 25 being a storage medium includes a module that describes procedures required for forming an image of illumination light by using the above described method. In addition, the DVD-ROM 25 records data required for carrying out the above described method, for example, image data of the texture shown in FIG. 3. A program module for expressing an image of illumination light is read out and executed in the case were it is required to depict illumination light according to the present invention in a process for generating image data of each frame. FIG. 8 is a flow chart showing an outline of processing executed by the program module. Publicly known technique can be used intact as computation processing required for generating image data other than a portion associated with expression of the above described illumination light. A description of such technique is omitted here in the specification. For example, in processing for depicting a typical 3D game image, a position such as an object (for example, character) or the view point disposed in the world coordinate system is computed based on an input signal from the input device 22. Based on the computation result, coordinate conversion into a view point coordinate system or screen coordinate system or rendering processing is carried out. Hereinafter, a description will be given with respect to processing functions deeply related to the present invention, of a series of these processing functions. A description of the other processing functions is omitted here.

Processing of FIG. 8 first computes a distance from a view point to a light source set in a virtual three-dimensional space and a deviation between the direction in which the light source is viewed from the viewpoint and the optic axis direction (step S1). Next, based on the calculated distance, the diameter (size) of the polygon 2 to be disposed at the light source position and the transparency of texture to be mapped to the polygon 2 are computed (step S2). Subsequently, based on the computation result at the step S1, the number of polygons 4 to be disposed in the virtual region 5, the position and diameter (size) in virtual three-dimensional space of each polygon 4, and the transparency of texture to be mapped to each polygon 4 are computed (step S3). Namely, the position of the center point of each polygon 4 shown in FIG. 1 or FIG. 2 or the number of polygons 4 disposed in the virtual region 5 or the like is calculated based on a distance from the view point to the light source 1 and a relationship between the direction in which the light source 1 is viewed from the view point and the optic axis direction.

When computation terminates, it is judged whether or not a polygon of which the transparency of texture to be mapped is set to 100 exists (step S4). When it exists, the polygon 4 falling into such condition is eliminated from a depicting target (step S5). The eliminated polygon 4 is not targeted for coordinate conversion or rendering. Thus, a burden requiring image processing is reduced. When it is negatively judged at the step S4, the processing at the step S5 is skipped.

As described above, information required for forming an image of illumination light is acquired. The computation result is stored in a cache memory of CPU 11, for example, (step S6), whereby processing of FIG. 8 is terminated. The stored computation result is referred to during rendering, whereby texture mapping based on the computation result or the like is carried out, and a game image of one frame including an image of illumination light is formed.

The above described embodiment is merely provided as an example of the present invention, the number of available polygons and the contents of texture or the like may be variously changed according to a required image quality or the like. Although the above embodiment has described a circular polygon for expressing illumination light, in the present invention, a polygonal polygon may be used without being limited to such circular polygon. Even if the shape of texture itself is polygonal, as long as circular divergence of the illumination light is depicted on a transparent background, an observer can observe such circular divergence of illumination light when the illumination light is mapped to the polygon.

As has been described above, according to an image expression of the present invention, polygons with different sizes are arranged along an optic axis direction, and the texture of illumination light is mapped to these polygons, whereby a virtual region as if illumination light were divergent can be observed from a view point. Thus, the illumination light can be naturally expressed so that the luminance is high at the center side of the virtual region, and is low at the periphery. Moreover, a processing load is reduced because polygons being planar graphics are arranged along the optic axis instead of configuring a complicate three-dimensional model by polygons. The size or magnification of a virtual region is controlled based on a distance from a view point and a relationship between an optic axis direction and a direction in which a light source is viewed from a view point. Thus, the coverage of divergence of illumination light is changed according to a position of the light source viewed from a view point or according to a change in optic axis direction, and the reality of an image of illumination light can be sufficiently improved.

What is claimed is:

1. An image expression method for expressing illumination light from a light source placed in a virtual three-dimensional space by image processing employing a computer, said method comprising the steps of:

disposing a plurality of polygons, each of which corresponds to a shape of a transverse cross section at each position of a virtual region that gradually expands with advancement from the light source in an optic axis direction, at respective positions spaced from each other on the optic axis of the illumination light so that a normal of each polygon is oriented toward a view point set in the virtual three-dimensional space, said disposing step comprising the step of setting the respective positions such that at least adjacent polygons are partially superimposed on each other;

mapping a texture that expresses divergence of the illumination light to each polygon;

changing a size of the virtual region in a direction orthogonal to the optic axis based on a distance from a view point to the light source; and differentiating a magnification of the virtual region to the distance from the light source based on a relationship between the optic axis and a direction in which the light source is viewed from the view point.

2. The image expression method according to claim 1, wherein the step of changing the size of the virtual region comprises the step of expanding the virtual region in the direction orthogonal to the optic axis as the distance from the view point to the light source increases.

3. The image expression method according to claim 1, wherein the step of changing the size of the virtual region comprises the step of expanding the virtual region in the direction orthogonal to the optic axis uniformly over the full length of the optic axis direction as the distance from the view point to the light source increases.

4. The image expression method according to claim 1, wherein the step of differentiating the magnification of the virtual region comprises the step of setting the magnification of the virtual region to the distance from the light source smaller as the relationship between the optic axis direction and the direction in which the light source is viewed from the view point is closer to an orthogonal state.

5. The image expression method according to claim 4, further comprising the step of reducing the number of polygons as the relationship between the optic axis direction and the direction in which the light source is viewed from the view point is closer to a parallel state.

6. The image expression method according to claim 1, further comprising the step of increasing the transparency of each texture as the distance from the view point to the light source increases.

7. The image expression method according to claim 6, further comprising the step of eliminating a polygon of which the transparency of a texture to be mapped is greater than a predetermined value from a depicting target.

8. The image expression method according to claim 1, further comprising the steps of:
disposing the texture mapped polygon at a predetermined reference point associated with the light source, and
changing the size of polygon at the reference point based on the distance from the view point to the light source.

9. The image expression method according to claim 8, further comprising the step of expanding the polygon at the reference point as the distance from the view point to the light source increases.

10. The image expression method according to claim 8, further comprising the step of decreasing the transparency of the polygon at the reference point as the distance from the view point to the light source increases.

11. A program for expressing illumination light from a light source placed in a virtual three-dimensional space by image processing employing a computer, said program causing the computer to execute:
a process for disposing a plurality of polygons, each of which corresponds to a shape of a transverse cross section at each position of a virtual region that gradually expands with advancement from the light source in an optic axis direction, at respective positions spaced from each other on an optic axis of the illumination light so that a normal of each polygon is oriented toward a view point set in the virtual three-dimensional space; and
a process for mapping a texture that expresses divergence of the illumination light to each polygon, wherein,
in the disposing process,
the respective positions are set in such a manner that at least adjacent polygons are partially superimposed on each other,
a size of the virtual region is changed in a direction orthogonal to the optic axis based on a distance from the view point to the light source, and
a magnification of the virtual region to the distance from the light source is differentiated based on a relationship between the optic axis and a direction in which the light source is viewed from the view point.

12. The program according to claim 11, wherein said program is further arranged to cause the computer to expand the virtual region in a direction orthogonal to the optic axis as the distance from the view point to the light source increases.

13. The program according to claim 11, wherein said program is further arranged to cause the computer to expand the virtual region in a direction orthogonal to the optic axis uniformly over the full length of the optic axis direction as the distance from the view point to the light source increases.

14. The program according to claim 11, wherein said program is further arranged to cause the computer to set the magnification of the virtual region to the distance from the light source smaller as the relationship between the optic axis direction and the direction in which the light source is viewed from the view point is closer to an orthogonal state.

15. The program according to claim 14, wherein said program is further arranged to cause the computer to decrease the number of polygons as the relationship between the optic axis direction and the direction in which the light source is viewed from the view point is closer to a parallel state.

16. The program according to claim 11, wherein said program is further arranged to cause the computer to increase the transparency of each texture as a distance from the view point to the light source increases.

17. The program according to claim 16, wherein said program is further arranged to cause the computer to eliminate a polygon of which the transparency of a texture to be mapped is greater than a predetermined value from a depicting target.

18. The program according to claim 11, wherein said program is further arranged to cause the computer to dispose the texture mapped polygon at a predetermined reference point associated with the light source, and change the size of the polygon on the reference point based on the distance from the view point to the light source.

19. The program according to claim 18, wherein said program is further arranged to cause the computer to expand the polygon at the reference point as the distance from the view point to the light source increases.

20. The program according to claim 18, wherein said program is further arranged to cause the computer to decrease the transparency of the polygon at the reference point as the distance from the view point to the light source increases.

21. The image expression method according to claim 1, wherein the magnification of the virtual region to the distance from the light source is differentiated such that a realistic image of the illumination light going along the optic axis is provided when the direction of the optic axis is different from the direction between the light source and the view point.

22. The program according to claim 11, wherein the program is further arranged to cause the computer to differentiate the magnification of the virtual region to the distance from the light source such that a realistic image of the illumination light going along the optic axis is provided when the direction of the optic axis is different from the direction between the light source and the view point.

* * * * *